(12) United States Patent
Uceda-Sosa et al.

(10) Patent No.: US 12,248,521 B1
(45) Date of Patent: Mar. 11, 2025

(54) SEARCH USING AN OVERLAY GRAPH MAPPING TO SOURCE KNOWLEDGE GRAPHS

(71) Applicant: INTERNATIONAL BUSINESS MACHINES CORPORATION, Armonk, NY (US)

(72) Inventors: Rosario Uceda-Sosa, Hartsdale, NY (US); Guilherme Augusto Ferreira Lima, Campinas (BR); Achille Belly Fokoue-Nkoutche, White Plains, NY (US); Alexander Gray, Yonkers, NY (US); Maria Chang, Irvington, NY (US); Marcelo Machado, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/456,999

(22) Filed: Aug. 28, 2023

(51) Int. Cl.
*G06F 16/90* (2019.01)
*G06F 16/903* (2019.01)
*G06F 16/9038* (2019.01)

(52) U.S. Cl.
CPC .... *G06F 16/9038* (2019.01); *G06F 16/90335* (2019.01)

(58) Field of Classification Search
CPC .............. G06F 16/9038; G06F 16/90335
See application file for complete search history.

(56) References Cited

U.S. PATENT DOCUMENTS

| 8,620,931 B2 | 12/2013 | Zillner |
| 11,531,817 B2 * | 12/2022 | Aditya ................... G06N 20/00 |

(Continued)

FOREIGN PATENT DOCUMENTS

| WO | 2004075466 A2 | 9/2004 |
| WO | 2020139861 A1 | 7/2020 |

OTHER PUBLICATIONS

Dai, et al., "A Knowledge-Based Service Composition Algorithm with Better QoS in Semantic Overlay," Mathematical Problems in Engineering 2015 (2015), 7 pp.

(Continued)

*Primary Examiner* — Etienne P Leroux
*Assistant Examiner* — Cindy Nguyen
(74) *Attorney, Agent, or Firm* — KONRAD, RAYNES, DAVDA & VICTOR LLP; Janaki K. Davda

(57) ABSTRACT

Provided are techniques for a search using an overlay graph mapping to source knowledge graphs. A plurality of overlay graphs are generated, where each overlay graph comprises entities represented by nodes and relations represented by edges, and where the entities and the relations map to a subset of entities and relations in a plurality of source knowledge graphs. A search request comprising an entity and a relation is received. An overlay graph is selected from the plurality of overlay graphs based on the entity and the relation. The search request is issued against the overlay graph, where the search request is translated to knowledge graph specific queries, and where the knowledge graph specific queries are issued against the plurality of source knowledge graphs. Search results are received from the plurality of source knowledge graphs. The search results are used to respond to the search request.

20 Claims, 14 Drawing Sheets

(56) References Cited

U.S. PATENT DOCUMENTS

| | | | | |
|---|---|---|---|---|
| 2015/0095303 | A1* | 4/2015 | Sonmez | G06N 5/01 707/707 |
| 2020/0272624 | A1 | 8/2020 | Aggour et al. | |
| 2022/0129766 | A1 | 4/2022 | Potts et al. | |
| 2022/0129770 | A1* | 4/2022 | Mihindukulasooriya | G06N 5/02 |
| 2023/0350931 | A1* | 11/2023 | Lewis | G06F 16/338 |

OTHER PUBLICATIONS

Tarakci, et al., "UCASFUM: A Ubiquitous Context-Aware Semantic Fuzzy User Modeling System," International Conference on Knowledge Engineering and Ontology Development, v. 2, Scitepress, 2012, pp. 278-283.

Soergel, "WordNet: An Electronic Lexical Database," ResearchGate, Oct. 1998, 8 pp.

Speer, et al., "ConceptNet 5.5: An Open Multilingual Graph of General Knowledge," Association for the Advancement of Artificial Intelligence, Proceedings of the Thirty-First AAAI Conference on Artificial Intelligence, 2017, .9 pp.

Xiao, et al., "Efficient Ontology-Based Data Integration with Canonical IRIs," ESWC (2018), 15 pp.

Ullman, "Information Integration Using Logical Views," Proceedings of the 6th International Conference on Database Theory. vol. 22, 1997, 22 pp.

Calvanese, et al., "The Mastri System for Ontology-based Data Access," IOS Press, 2010, 11 pp.

Calvanese, et al., "Ontology-based Integration of Cross-linked Datasets," In: SEMWEB (2015), 22 pp.

McGuinness, "OWL Web Ontology Language Guide", ResearchGate, Jan. 2004, 22 pp.

Verborgh, et al., "Querying Datasets on the Web with High Availability," Proceedings of the 13th International Semantic Web Conference. Lecture Notes in Computer Science, vol. 8796, 16 pp., Springer (Oct. 2014), http://linkeddatafragments.org/publications/iswc2014.pdf.

Beckett, et al., "RDF 1.1 Turtle," W3C recommendation, W3C (Feb. 25, 2014), 14 pp., http://www.w3.org/TR/2014/ REC-turtle-20140225/.

Hyland-Wood, "RDF 1.1 Concept and Abstract Syntax," W3C recommendation, W3C (2014), 23 pp.,http://www.w3.org/TR/2014/REC-rdf11-concepts-20140225/.

Charalambidis, et al., "Semagrow: optimizing federated SPARQL queries," ResearchGate, Sep. 2015, 9 pp., https://doi.org/10.1145/2814864.2814886.

Bonial, et al., "PropBank: Semantics of New Predicate Types," Proceedings of the 9th edition of the Language Resources and Evaluation Conference (2014) 7 pp.

Brown, et al., "VerbNet Representations: Subevent Semantics for Transfer Verbs," Proceedings of the First International Workshop on Designing Meaning Representations. 10 pp., Association for Computational Linguistics, Florence, Italy (Aug. 2019). https://doi.org/10.18653/v1/W19-3318, https://aclanthology.org/W19-3318.

Xiao, "The Virtual Knowledge Graph System Ontop," SEMWEB (2020) 4 pp.

Xiao, et al., "Virtual Knowledge Graphs: An Overview of Systems and Use Cases," Chinese Academy of Sciences, 2019, 23 pp.

Verborgh, et al., "Web-Scale Querying through Linked Data Fragments," Proceedings of the 7th Workshop on Linked Data on the Web. CEUR Workshop Proceedings, vol. 1184, 10 pp., (Apr. 2014), http://ceur-ws.org/Vol-1184/Idow2014_paper_04.pdf.

Vrandecic, et al., "Wikidata: A Free Collaborative Knowledge Base," Communications of the ACM 57(10), 8 pp., Oct. 2014). https://doi.org/10.1145/2629489.

DeMoura, et al., "Z3: An Efficient SMT Solver," Microsoft Research, vol. 4963, 4 pp. (Apr. 2008).

"Federated knowledge graphs", Wikimedia, [online][retrieved on Aug. 3, 2023] https://meta.wikimedia.org/wiki/Federated knowledge graphs, 6 pp.

"AgreementMakerLight/AMLProject: AgreementMakerLight Eclipse Project", GitHub, [online][retrieved on Aug. 3, 2023] https://github.com/AgreementMakerLight/AML-Project, 3 pp.

"Maximize the Value of Your Data!", Ontotext, [online][retrieved on Aug. 3, 2023] https://www.ontotext.com, 12 pp.

"Lexicon Model for Ontologies: Community Report", Ontology-Lexicon Community Group, May 10, 2016, [online] [retrieved on Aug. 3, 2023] https://www.w3.org/2016/05/ontolex, 42 pp.

"Ontolex/lexinfo: LexInfo—Data Category Ontology for OntoLex-Lemon", GitHub, [online][retrieved on Aug. 3, 2023] https://github.com/ontolex/lexinfo, 2 pp.

"Wikipedia: Contents/Categories", Wikipedia, [online][retrieved on Aug. 4, 2023] https://en.wikipedia.org/wiki/Wikipedia:Contents/Categories, 9 pp.

"OWL 2 Web Ontology Language Document Overview (Second Edition)", W3C, Dec. 11, 2012, [online][retrieved Aug. 21, 2023] https://www.w3.org/TR/2012/REC-owl2-overview-20121211/, 9 pp.

"Lexicon Model for Ontologies: Community Report", Ontology-Lexicon Community Group, May 10 2016, [online] [retrieved on Aug. 3, 2023] https://www.w3.org/2016/05/ontolex, 84 pp. (submitted as PartA 42 pp. and PartB 42 pp.).

* cited by examiner

Overlay 300

310

RO-GRAPH:

$RO_{graph} = E_{ovset} + R_{ovset} + T_{ovset}$ where:

$E_{ovset}$ = (road, vehicle)

$R_{ovset}$ = (hasLocation, typeOf, usedBy)

$T_{ovset} = <e_i, p, e_j>$ where $e_i, e_j \in E_{ovset}$ and $p \in R_{ovset}$

320

RO-RULES:

- Rule 1 - IF node $e_i$ is a subConcept or instanceOf $e_j$, which maps to $e \in E_{ovset}$ then $e_i$ is in $E_{ovset}$

- Rule 2 - IF $p_i$ is a sub-property of $p_j$ which is mapped to $p \in R_{ovset}$ then $p_i$ is in $R_{ovset}$

- Rule 3 - IF $(e_i, p, e_j)$ is a tuple in a member of the knowledge graph where each member is mapped to an element in RO-GRAPH, then the tuple itself is also part of the RO-GRAPH.

- Rule 4 - IF $(e_i, p, e_j)$ is in RO-GRAPH and $e$ maps to $e_i$ then $(e, p, e_j)$ is also an edge of the RO-GRAPH. Same for $e_j$.

- Rule 5 - IF $(e_i, p_k, e_j)$ is in RO-GRAPH and $p_k$ maps to $p$ then $(e, p, e_j)$ is also an edge of the RO-GRAPH.

Predicate Mappings:

Map-WD(road, https://www.wikidata.org/wiki/Q34442-road)
Map-WD(vehicle, https://www.wikidata.org/wiki/Q42889-vehicle)
Map-WD(hasLocation, https://www.wikidata.org/wiki/Property:P276-location)
Map-WD(typeOf, https://www.wikidata.org/wiki/Property:P31-instanceOf)
Map-WD(partOf, https://www.wikidata.org/wiki/Property:P527-partOf)
Map-ConceptNet(road, https://conceptnet.io/c/en/road)
Map-ConceptNet(vehicle, https://conceptnet.io/c/en/vehicle)
Map-ConceptNet(hasLocation, https://conceptnet.io/c/en/atLocation)
Map-ConceptNet(typeOf, https://conceptnet.io/c/en/IsA)

Tuples:

(conceptnet.io/c/en/car, hasLocation, conceptnet.io/c/en/road)
(car, hasLocation, road)
(Car-123-Q108464318, hasLocation, Q34442-road)
(Car-123-Q108464318, hasLocation, road)
(Car-123, hasLocation, road)

RO-RULES:

- Rule 1 - IF node ($e_i$, IsA, $e_j$) in $k_g$ and $Map_n(e_i, e)$ (meaning $e \in N_{ov}$), then $e_i$ is in $N_{ov}$ and $e_j$ is in $N_{ov}$.

- Rule 2 - IF $p_i$ is a sub-property of $p_j$ and $Map_R(p_j, p)$ then $p_i$ is in $R_{ov}$. Note that the fact that $p_j$ maps to p means that it's also in the overlay.

- Rule 3 - IF ($e_i$, p, $e_j$) is a tuple in a source knowledge graph, where each member is mapped to an element in RO-GRAPH, then the tuple itself is also part of the RO-GRAPH.

- Rule 4 - IF ($e_i$, p, $e_j$) is in RO-GRAPH and e maps to $e_i$ then (e, p, $e_j$) is also an edge of the RO-GRAPH. Same for $e_j$.

- Rule 5 - IF ($e_i$, $p_k$, $e_j$) is in RO-GRAPH and $p_k$ maps to p then (e, p, $e_j$) is also an edge of the RO-GRAPH.

FIG. 5

```
[1]: from ulkb import *
```

```
[2]: Wikidata = 'https://blazegraph-wikidata.bx.cloud9.ibm.com/bigdata/namespace/wdq/
     ↪sparql'
     ConceptNet = 'https://blazegraph-wikidata.bx.cloud9.ibm.com/bigdata/namespace/
     ↪ConceptNet/sparql'
     settings.graph.uri = 'http://localhost:3000/sparql'
     settings.debug = False
     settings.graph.with_label = True
     settings.graph.with_description = False
```

```
[3]: Concept = new_base_type('Concept')
     Property = FunctionType(Concept, Concept, bool)
```

```
[4]: x, y, z = Variables('x', 'y', 'z', Concept)
     p, q, r = Variables('p', 'q', 'r', Property)
```

0.0.1 ULKB

```
[5]: Road = new_constant('ulkb:Road', Concept)
        Car = new_constant('ulkb:Car', Concept)
```

```
[6]: hasLocation = new_constant('ulkb:hasLocation', Property)
     hasType = new_constant('ulkb:hasType', Property)
```

0.0.2 Wikidata

```
[7]: wd_road = new_constant('wd:Q34442', Concept, label="road")
     wd_car = new_constant('wd:Q1420', Concept, label="car")
```

```
[8]: wd_location = new_constant('wdt:P276', Property, label="location")
     wd_instanceOf = new_constant('wdt:P31', Property, label="instance of")
     wd_subClassOf = new_constant('wdt:279', Property, label="subclass of")
```

```
┌─ 610 ─────────────────────────────────────────────────────────┐
│         0.0.3 ConceptNet                                      │
│ [9]  : │ cn_road = new_constant('cnc:road', Concept)         │
│        │ cn_car = Constant('cnc:car', Concept)               │
│                                                               │
│ [10] : │ cn_AtLocation = new_constant('cnr:AtLocation', Property)│
│        │ cn_IsA = new_constant('cnr:IsA', Property)          │
│        │ cn_ExternalURL = new_constant('cnr:ExternalURL', Property)│
│         0.0.4 Overlay rules                                   │
│ [11] : │ # Relation overlay                                   │
│        │ new_axiom('ax_hasLocation',                          │
│        │     Forall(x, y, Implies(wd_location(x,y) | cn_AtLocation(x,y),│
│        │                           hasLocation(x,y))))        │
│        │                                                       │
│        │ new_axiom('ax_hasType',                              │
│        │     Forall(x, y, Implies(wd_instanceOf(x,y) | cn_IsA(x,y),│
│        │                           hasType(x,y))))            │
│        │                                                       │
│        │ new_axiom('ax_cn_wd',                                │
│        │     Forall(x, y, Implies(cn_ExternalURL(x, y), Equal(x, y))))│
│        │                                                       │
│        │ # Entity overlay                                     │
│        │ new_axiom('ax_Road',                                 │
│        │     Equal(wd_road, Road) & Equal(cn_road, Road))     │
│        │                                                       │
│        │ new_axiom('ax_Car',                                  │
│        │     Equal(wd_car, Car) & Equal(cn_car, Car))         │
│        │                                                       │
│        │ show_axioms()                                        │
│                                                               │
│         37: (NewAxiom ax_hasLocation  x y, «location» x y    cnr:AtLocation x y →│
│         ulkb:hasLocation x y)                                 │
│         39: (NewAxiom ax_hasType   x y, «instance of» x y   cnr:IsA x y → ulkb:hasType│
│         x y)                                                  │
│         41: (NewAxiom ax_cn_wd    x y, cnr:ExternalURL x y → x = y)│
│         43: (NewAxiom ax_Road   «road» = ulkb:Road   cnc:road = ulkb:Road)│
│         45: (NewAxiom ax_Car   «car» = ulkb:Car   cnc:car = ulkb:Car)│
│         0.0.5 KG Facts                                        │
│ [12] : │ # single hop to/from obj using some declared property│
│        │ def load_axioms_about(obj, using=settings.graph.uri, limit=500, debug=False):│
│        │     from ulkb import util                            │
│        │     with settings.graph(uri=using):                  │
│        │         x = Variable('x', obj.type)                  │
└───────────────────────────────────────────────────────────────┘
```

```
          n = 1
          for stmt in util.chain(
              graph.paths(obj, x, length=1, limit=limit),
              graph.paths(x, obj, length=1, limit=limit)):
              p, s, o = stmt.unfold_application()

# known property? if not, skip
              if p not in Theory.top.constants:
                  continue known concept? if not, add
              if o not in Theory.top.constants:
                  Theory.top.extend(NewConstant(o))

# add new p(s,o) axiom
              ax = new_axiom(f'ax_{obj.id}_{n}', stmt)
              if debug:
                  print('LOADED', ax)
              n += 1
          print(f'loaded {n} axioms about {obj}')
```

[13]: `load_axioms_about(cn_road, using=ConceptNet)` loaded 41 axioms about cnc:road

[14]: `load_axioms_about(wd_road, using=Wikidata)` loaded 3 axioms about «road»

0.0.6 Theory so far...

[15]: `show_axioms()`

37: (NewAxiom ax_hasLocation    x y, «location» x y    cnr:AtLocation x y →
ulkb:hasLocation x y)
39: (NewAxiom ax_hasType    x y, «instance of» x y    cnr:IsA x y →
ulkb:hasType x y)
41: (NewAxiom ax_cn_wd    x y, cnr:ExternalURL x y → x = y)
43: (NewAxiom ax_Road    «road» = ulkb:Road    cnc:road = ulkb:Road)
45: (NewAxiom ax_Car    «car» = ulkb:Car    cnc:car = ulkb:Car)
48: (NewAxiom ax_cnc:road_1    cnr:AtLocation cnc:road cnc:bridge)
51: (NewAxiom ax_cnc:road_2    cnr:IsA cnc:road cnc:another_word_for_street)
54: (NewAxiom ax_cnc:road_3    cnr:AtLocation cnc:road cnc:maps)
57: (NewAxiom ax_cnc:road_4    cnr:AtLocation cnc:road cnc:north_america)
60: (NewAxiom ax_cnc:road_5    cnr:AtLocation cnc:road cnc:oregon)
63: (NewAxiom ax_cnc:road_6    cnr:AtLocation cnc:road cnc:roadblock)
66: (NewAxiom ax_cnc:road_7    cnr:IsA cnc:road cnc:paved_surface)
69: (NewAxiom ax_cnc:road_8    cnr:IsA cnc:road cnc:place_where_vehicles_travel)

```
72: (NewAxiom ax_cnc:road_9   cnr:AtLocation cnc:road cnc:texas)
75: (NewAxiom ax_cnc:road_10  cnr:AtLocation cnc:road cnc:toronto)
78: (NewAxiom ax_cnc:road_11  cnr:AtLocation cnc:road cnc:town)
80: (NewAxiom ax_cnc:road_12  cnr:ExternalURL cnc:road wd:Q34442)
83: (NewAxiom ax_cnc:road_13  cnr:AtLocation cnc:road cnc:valley)
86: (NewAxiom ax_cnc:road_14  cnr:ExternalURL cnc:road
http://dbpedia.org/resource/Road)
89: (NewAxiom ax_cnc:road_15  cnr:ExternalURL cnc:road
http://en.wiktionary.org/wiki/A_road)
92: (NewAxiom ax_cnc:road_16  cnr:ExternalURL cnc:road
http://en.wiktionary.org/wiki/A-road)
95: (NewAxiom ax_cnc:road_17  cnr:ExternalURL cnc:road
http://en.wiktionary.org/wiki/road)
98: (NewAxiom ax_cnc:road_18  cnr:ExternalURL cnc:road
http://fr.wiktionary.org/wiki/A-road)
101: (NewAxiom ax_cnc:road_19  cnr:ExternalURL cnc:road
http://fr.wiktionary.org/wiki/road)
104: (NewAxiom ax_cnc:road_20  cnr:IsA cnc:road cnc:wide_path)
106: (NewAxiom ax_cnc:road_21  cnr:AtLocation cnc:automobiles cnc:road)
108: (NewAxiom ax_cnc:road_22  cnr:AtLocation cnc:car cnc:road)
110: (NewAxiom ax_cnc:road_23  cnr:AtLocation cnc:crossroads cnc:road)
112: (NewAxiom ax_cnc:road_24  cnr:IsA cnc:avenue cnc:road)
114: (NewAxiom ax_cnc:road_25  cnr:AtLocation cnc:fork cnc:road)
116: (NewAxiom ax_cnc:road_26  cnr:AtLocation cnc:intersection cnc:road)
118: (NewAxiom ax_cnc:road_27  cnr:IsA cnc:creek_parkway cnc:road)
120: (NewAxiom ax_cnc:road_28  cnr:AtLocation cnc:lane cnc:road)
122: (NewAxiom ax_cnc:road_29  cnr:IsA cnc:flyover cnc:road)
124: (NewAxiom ax_cnc:road_30  cnr:IsA cnc:freeway cnc:road)
126: (NewAxiom ax_cnc:road_31  cnr:IsA cnc:highway cnc:road)
128: (NewAxiom ax_cnc:road_32  cnr:IsA cnc:kings_highway cnc:road)
130: (NewAxiom ax_cnc:road_33  cnr:IsA cnc:natchez_trace cnc:road)
132: (NewAxiom ax_cnc:road_34  cnr:IsA cnc:one_kind_of_prepared_surface
cnc:road)
134: (NewAxiom ax_cnc:road_35  cnr:IsA cnc:parkway cnc:road)
136: (NewAxiom ax_cnc:road_36  cnr:AtLocation cnc:toll_road cnc:road)
138: (NewAxiom ax_cnc:road_37  cnr:AtLocation cnc:truck cnc:road)
140: (NewAxiom ax_cnc:road_38  cnr:IsA cnc:state_highway cnc:road)
142: (NewAxiom ax_cnc:road_39  cnr:IsA http://conceptnet.io/c/en/street/n
cnc:road)
144: (NewAxiom ax_cnc:road_40  cnr:IsA cnc:turnpike cnc:road)
147: (NewAxiom ax_wd:Q34442_1  «location» «road» «landmass»)
150: (NewAxiom ax_wd:Q34442_2  «instance of» «road» «road transport
infrastructure»)
```

640

0.0.7 Reasoning
Can we prove that something is located in Road? Yes

[16] : RuleZ3(Exists(x, hasLocation(x, Road)))

[16] : < x, ulkb:hasLocation x ulkb:Road>

Can we prove that Car, cn_car, and wd_car are located in Road? Yes

[17] : RuleZ3(hasLocation(Car, Road))

[17] : < ulkb:hasLocation ulkb:Car ulkb:Road>

[18] : RuleZ3(hasLocation(cn_car, Road))

[18] : < ulkb:hasLocation cnc:car ulkb:Road>

[19] : RuleZ3(hasLocation(wd_car, Road))

[19] : < ulkb:hasLocation «car» ulkb:Road>

FIG. 6E

SEARCH USING AN OVERLAY GRAPH MAPPING TO SOURCE KNOWLEDGE GRAPHS

This invention was made with government support under Contract Number FA8750-19-C-0206 awarded by Defense Advanced Research Projects Agency (DARPA). The government has certain rights to this invention.

BACKGROUND

Embodiments of the invention relate to search using an overlay graph mapping to source knowledge graphs. Certain embodiments of the invention relate to federation of ontologic source knowledge graphs via entity and relation mappings to the overlay graph to improve searches.

Modern Artificial Intelligence (AI) applications require access to large, heterogeneous data sources (e.g., ontologic knowledge graphs), which are available from open source, proprietary, academic, and commercial sources. Currently, multiple ontologic knowledge graphs may be searched separately, which is time consuming.

SUMMARY

In accordance with certain embodiments, a computer-implemented method comprising operations is provided for a search using an overlay graph mapping to source knowledge graphs. In such embodiments, a plurality of overlay graphs are generated, where each overlay graph comprises entities represented by nodes and relations represented by edges, and where the entities and the relations map to a subset of entities and relations in a plurality of source knowledge graphs. A search request comprising an entity and a relation is received. An overlay graph is selected from the plurality of overlay graphs based on the entity and the relation. The search request is issued against the overlay graph, where the search request is translated to knowledge graph specific queries, and where the knowledge graph specific queries are issued against the plurality of source knowledge graphs. Search results are received from the plurality of source knowledge graphs. The search results are used to respond to the search request.

In accordance with other embodiments, a computer program product comprising a computer readable storage medium having program code embodied therewith is provided, where the program code is executable by at least one processor to perform operations for a search using an overlay graph mapping to source knowledge graphs. In such embodiments, a plurality of overlay graphs are generated, where each overlay graph comprises entities represented by nodes and relations represented by edges, and where the entities and the relations map to a subset of entities and relations in a plurality of source knowledge graphs. A search request comprising an entity and a relation is received. An overlay graph is selected from the plurality of overlay graphs based on the entity and the relation. The search request is issued against the overlay graph, where the search request is translated to knowledge graph specific queries, and where the knowledge graph specific queries are issued against the plurality of source knowledge graphs. Search results are received from the plurality of source knowledge graphs. The search results are used to respond to the search request.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for a search using an overlay graph mapping to source knowledge graphs. In such embodiments, a plurality of overlay graphs are generated, where each overlay graph comprises entities represented by nodes and relations represented by edges, and where the entities and the relations map to a subset of entities and relations in a plurality of source knowledge graphs. A search request comprising an entity and a relation is received. An overlay graph is selected from the plurality of overlay graphs based on the entity and the relation. The search request is issued against the overlay graph, where the search request is translated to knowledge graph specific queries, and where the knowledge graph specific queries are issued against the plurality of source knowledge graphs. Search results are received from the plurality of source knowledge graphs. The search results are used to respond to the search request.

BRIEF DESCRIPTION OF THE SEVERAL VIEWS OF THE DRAWINGS

Referring now to the drawings in which like reference numbers represent corresponding parts throughout:

FIG. 3 illustrates an entity and relation overlay example in accordance with certain embodiments.

FIG. 4A illustrates predicate mappings in accordance with certain embodiments.

FIG. 4B illustrates resulting tuples from the query in accordance with certain embodiments.

FIG. 5 illustrates rules for the overlay in accordance with certain embodiments.

FIGS. 6A-6E illustrate an example of tuples that may be expressed as a set of statements in a logic language that may be processed with a reasoner in accordance with certain embodiments.

DETAILED DESCRIPTION

Figure 1:
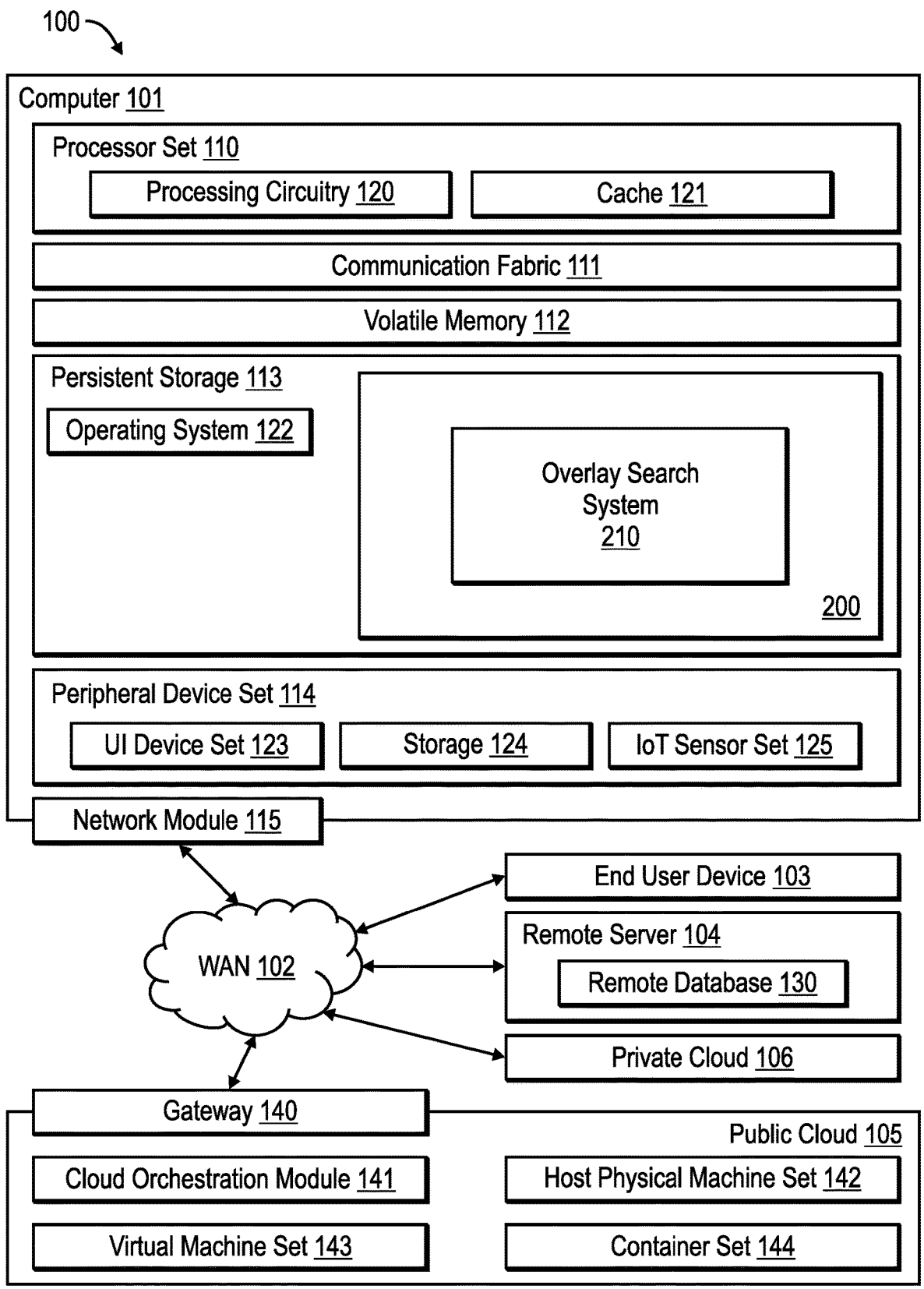
FIG. 1 illustrates a computing environment in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 of contains an example of an environment for the execution of at least some of the computer code involved in performing the inventive methods, such as an overlay search system 210 of block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
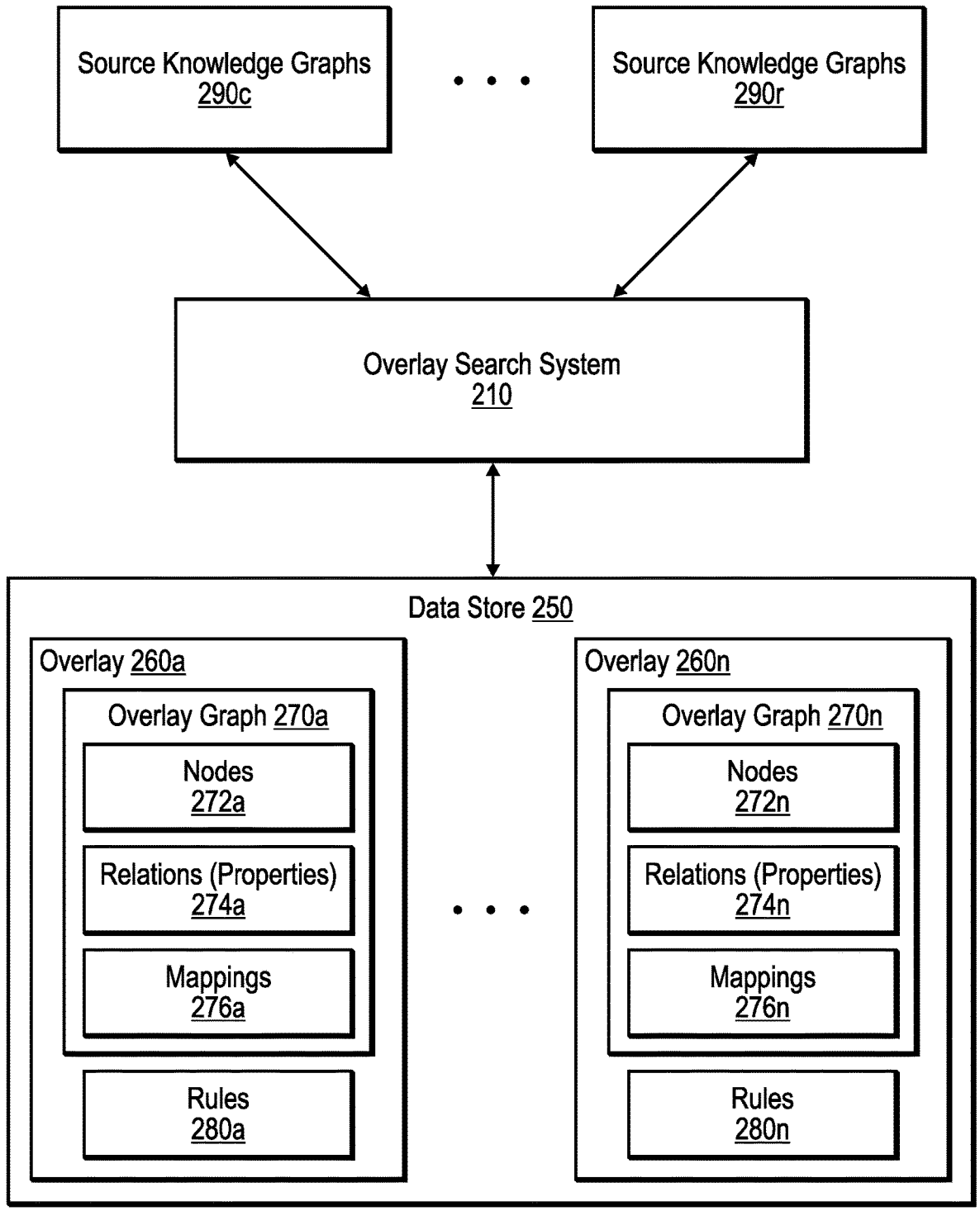
FIG. 2 illustrates, in a block diagram, a computing environment in accordance with certain embodiments.

FIG. 2 illustrates, in a block diagram, a computing environment in accordance with certain embodiments. The overlay search system 210 is connected to a data store 250. The data store 250 stores overlays 260a . . . 260n. Each overlay 260a . . . 260n includes an overlay graph 270a . . . 270n and rules 280a . . . 280n. Each overlay graph 270a . . . 270n includes nodes 272a . . . 272n, relations ("properties") 274a . . . 274n, and mappings 276a . . . 276n. The mappings 276a . . . 276n may also be referred to as mapping functions. In certain embodiments, the overlays 260a . . . 260n are generated before search requests are received. In other embodiments, the overlays 260a . . . 260n are received in response to receiving a search request in order to delimit the overlays 260a . . . 260n based on the search request. In yet other embodiments, at least some of the overlays 260a . . . 260n are generated before search requests are received, while other overlays 260a . . . 260n are generated in response to the search requests (e.g., if the desired overlay 260a . . . 260n corresponding to the search request has not been generated yet).

The overlay search system 210 is connected to source knowledge graphs 290c . . . 290r. The source knowledge graphs 290c . . . 290r may also be referred to as underlying knowledge graphs or underlying, source knowledge graphs. In some cases, the source knowledge graphs 290c . . . 290r may be source knowledge bases. The mappings 276 map entities (nodes) and relations (edges) of the source knowledge graphs 290c . . . 290r to entities (nodes) and relations (edges) of the overlay graph 270. The source knowledge graphs 290c . . . 290r may be heterogeneous (e.g., different from each other, such as by having different formats or different names for the same entity).

In certain embodiments, the overlay search system 210 provides federation and linking of multiple, source knowledge graphs with different data models and knowledge granularity. The overlay search system 210 also takes into account that the multiple, source knowledge graphs change over time.

The overlay search system 210 partially maps and accesses several ontologic source knowledge graphs to present a single, unified view of their data. The overlay search system 210 allows a partial explicit mapping through entity/relation overlays plus logical rules that dynamically generate aggregate knowledge in the form of tuples. Furthermore, the overlay search system 210 allows for the reasoning over these aggregate tuples.

In certain embodiments, the overlay search system 210 links ontologic source knowledge graphs in the Universal Logic Knowledge Base (ULKB), which is an ontology graph written in Resource Description Framework (RDF)/Web Ontology Language (OWL). The ULKB may be described as a system and framework that integrates linguistic and commonsense knowledge graphs under a single, virtual knowledge graph. ULKB provides a linked representation and a common interface to access and reason over these various knowledge graphs, casing their use by commonsense reasoning and language understanding applications. The ULKB may be described as an interface that allows access to multiple knowledge graphs.

The ULKB consists of two main components: (1) the ULKB knowledge graph augmented by a federation of external knowledge graphs, and (2) the ULKB logic, which may be described as a logic language and format for interchanging statements between the graph and external reasoners.

The Wikidata knowledge graph is one example of a source knowledge graph to be federated. For the Wikidata knowledge graph, each item has 1) an identifier (Q [number], such Q42), 2) a property (P [number], such as P69), and 3) a value (Q [number], such as Q691283).

The ConceptNet knowledge graph is another example of a source knowledge graph to be federated. The ConceptNet knowledge graph may be described as a semantic network that is used to help computers understand the meanings of words that people use. In certain embodiments, the ConceptNet knowledge graph may be a knowledge graph.

RDF/OWL graphs may be described as examples of semantic web knowledge graphs. An RDF/OWL graph is made up of nodes and object properties that label the edges among these nodes. Each node may also include datatype (or data) properties that associate a literal data field (e.g., a float, string, date, URI, etc.) to a node (e.g., node Person birthdate Aug. 4, 1961). Another type of property is an annotation property, which may be added to any type of object in the graph (both nodes and properties) and is used to represent metadata. The most common annotation properties are rdfs: label and rdfs: comment, but more annotation properties may be defined by the user.

RDF/OWL graphs may be used to define a type system of classes and properties (data or object), also called a theory box (T-Box). The instantiation of this type system, also consisting of nodes and properties, is called the assertion box (A-Box). Here is a simple T-Box of an ontology describing a company:
(Employee, worksFor, Enterprise)
(Employee, hasID, employeeID)
An A-Box instantiation would be:
(Person1, worksFor, Company5)
(Person1, hasID, "12345")

Here Employee and Enterprise are classes, worksFor is an object property, and hasID is a data property.

Oftentimes, useful graphs are complex. In fact, they are often composites of other graphs. A goal of the semantic web program is to define knowledge throughout the web as assets to be linked and reused. This is why the elements of a graph (nodes and properties) are qualified by a namespace that is specific to the graph. In the example above, the namespace is <http://www.company5.com/enterprise/>, which may be shortened by "ent:". Using this prefix, the example in RDF syntax is as follows:

@prefix ent: <http://www.company5.com/enterprise/>.
T-Box
ent: Employee ent: worksFor ent: Enterprise. ent: Employee ent: hasId ent: employeeID. #A-Box
ent: Person 1 ent: worksFor ent: Company5. ent: Person1 ent: hasId "12345".

Embodiments may leverage standard vocabularies, including: "xsd:" (which defines basic types such as xsd: float and xsd: string), "rdf:" (which defines basic properties and axioms, such as rdf: type), "rdfs:" (which defines rdfs: label and rdfs: comment), "owl:" (which defines owl: ObjectProperty), etc.

With reference to entity and relation graph overlays, conceptually, a graph overlay may be described as a (not necessarily connected) subgraph of a larger source knowledge graph. The overlay search system 210 implements overlays (1) by explicitly defining an overlay graph (the "seed overlay graph") in a new data model where nodes (entities) and edges (relations) are mapped by the overlay search system 210 to the nodes (entities) and edges (relations) of the underlying subgraph and (2) by defining logical rules that describe how to map new nodes (entities) and edges (relations) onto the overlay graph.

The overlay is an efficient way to define or "delimit" the scope of a source knowledge graph virtually. For example, a HelloEvent Wikidata overlay may be defined that covers events and their relations to one another (e.g., "causes" or "before") by setting the seed overlay graph to be the singleton concept Q1190554-occurrence and its subclasses and instances, as well as the edges among them. For example, this HelloEvent Wikidata overlay may be defined by the following SPARQL-like rules:

IF ?entity1 (wdt:P31-wdt:P279)*wd:Q1190554 THEN ? entity1 in HelloEvent.
IF ?entity2 (wdt:P31-wdt:P279)*wd:Q1190554 THEN ? entity2 in HelloEvent.
IF (?entity1, ?property, ?entity2) in the Wikidata knowledge graph, and ?entity1, ?entity2 in HelloEvent, then (?entity1, ?property, ?entity2) in HelloEvent.

The overlay search system 210 provides an overlay graph that may be used to query the source knowledge graphs.

First, the overlays limit the amount of information that is accessed about an entity or subgraph. For example, the parents of concert-Q182832 in the Wikidata knowledge graph include many non-productive concepts (or classes), such as Q19361238-Wikidata-Metaclass or Q24017465-Third-Order-Class. A non-productive concept may be described as one that is not useful (e.g., because it is too general, such as stating "a car is an entity"). However, by defining the overlay as including the children of a list of given parent concepts, the overlay search system 210 eliminates nonproductive concepts/classes in large upper ontologies.

Second, the overlays may be used to disambiguate or filter terms of interest for a given application. For example, the concept Q170584-project may be interpreted as both an activity or an organization (i.e., a social entity established to meet needs or pursue goals). Filtering this concept as an occurrence eliminates noisy information. Third, the overlays may be used to virtually link and integrate information from several large databases (a federated overlay). For example, in the ConceptNet knowledge graph, the terms conceptnet.io/c/en/situation and conceptnet.io/c/en/circumstance are the counterpart (not necessarily equivalent in the logic sense) to occurrence-Q1190554 in the Wikidata knowledge graph. The overlay search system 210 adds to the overlay an ontology-agnostic term (e.g., ulkb:occurrence) and maps that ontology-agnostic term to both terms above in the ConceptNet knowledge graph and Q1190554-occurrence. By using a common or overlapping overlay, the overlay search system 210 shields the end user from the details of the source ontologies implementation and enables reasoning about their combined, aggregate information. This is especially true if the overlay search system 210 maps, not just entities, but also properties (aka relations) that label the edges of the overlay.

In the following sections, it is assumed that the reader is familiar with Semantic Web knowledge graphs, in particular, RDF/OWL graphs. If that's not the case, a quick overview is included.

Examples herein are provided merely to enhance understanding, and embodiments are not limited to these examples. In the examples, references to relations and entities are to those that exist in the ontology-agnostic overlay, unless otherwise specified.

FIG. 3 illustrates an entity and relation overlay example in accordance with certain embodiments. In FIG. 3, an overlay 300 is defined as an overlay graph RO-GRAPH 310 and a set of rules RO-RULES 320. The overlay graph RO-GRAPH 310 includes nodes, properties or relations, and mappings from the overlay graph to multiple, source knowledge graphs.

In particular, the overlay graph $RO_{graph}$ is generated using $E_{ovset}+R_{ovset}+T_{ovset}$. $E_{ovset}$ defines the seed entities (or concepts). In this example, seed entities $E_{ovset}$=(road, vehicle), where "ovset" is the set of entities and relations defined in the overlay. Here, road is mapped through the predicate Map to road-Q34442 (in the WikiData knowledge graph) and to https://conceptnet.io/c/en/road (in the ConceptNet knowledge graph).

$R_{ovset}$ defines the seed relations (or properties). In this example, seed relations $R_{ovset}$=(hasLocation, typeOf, usedBy). Here, 1) hasLocation maps to conceptnet.io/c/en/AtLocation and to location-P276; 2) typeOf maps to conceptnet.io/c/en/IsA and to both instance-of-P31, subClassOf-P276; and 3) usedBy maps to conceptnet.io/c/en/usedFor (with no mapping to any relation in the WikiData knowledge graph).

In this example, $T_{ovset}$=<$e_i$, p, $e_j$> where $e_i$, $e_j \in E_{ovset}$ and $p \in R_{ovset}$. $T_{ovset}$ is the set of mappings.

The RO-RULES 320 describe the logical edges in the overlay (i.e., the federated overlay). With embodiments, the overlay search system 210 does not store or compute these edges physically, but uses reasoning engines to compute the edges.

Continuing with the example, the overlay search system 210 receives the question: "What types of things can you find on a road?". The overlay search system 210 translates the question into a set of one or more statements (e.g., SPARQL clauses). In this example, there is one SPARQL clause: (?x, locatedIn, road). This SPARQL clause (?x, locatedIn, road) defines a pattern that may be turned into a query. The overlay search system 210 is able to use the ConceptNet knowledge graph to retrieve data for this query. However, there is no ?x such that (?x, locatedIn, road) in the Wikidata knowledge graph, so the overlay search system 210 is not able to use the Wikidata knowledge graph to retrieve data for this query because that data does not exist in the Wikidata knowledge graph.

In the ConceptNet knowledge graph, there are tuples satisfying the query, but these tuples may have limited information. For example, take "Car-123". Is it likely this car (Car-123) is found on a road? The ConceptNet knowledge graph is not able to answer this question about a specific car as the car (Car-123) doesn't exist in the smaller graph of the ConceptNet knowledge graph. Instead, the overlay search system 210 determines that (1) cars are found in a road (from the ConceptNet knowledge graph) and (2) "Car-123" is a type of car (from the Wikidata knowledge graph). For this example, (Car-123-Q108464318, instanceOf-P31, vehicle-Q42889) is in the Wikidata knowledge graph.

Thus, to obtain a comprehensive answer (search results or results), the overlay search system 210 issues a federated query over both the ConceptNet knowledge graph and the Wikidata knowledge graph, leveraging the overlay.

First, the overlay search system 210 identifies the entities and relations in the query (?x, hasLocation, road) that are also found in the source knowledge graphs. To identify the entities present in the query (?x, hasLocation, road), the overlay search system 210 uses an entity linking service to fetch the correct Wikidata node, in this case Q34442-road. The overlay search system 210 uses virtual cross-graph links (to use ontology agnostic terms) to automatically compute the ConceptNet node that is mapped to Q34442-road, which is https://conceptnet.io/c/en/road.

As for the "located in" relation, the overlay search system 210 uses the relation overlay, which indicates that "located in" maps to hasLocation in the ULKB overlay. The overlay search system 210 reformulates the question from (?x, locatedIn, road) to (?x, hasLocation, road). That is, the "locatedIn" relation becomes the "hasLocation" relation.

The overlay search system 210 further validates that both the entity and the relation identified are part of the overlay 300.

Notice that if the question had asked for (?x, hasLocation, highway) instead, the overlay search system 210 would ascertain that highway IsA road and therefore part of the overlay. In this example, embodiments are using seed concepts already in the overlay.

Second, the query (?x, hasLocation, road) is issued to the overlay infrastructure service to identify the entities and relations in the overlay graph that correspond to the entities and relations of the query. In certain embodiments, the overlay search system 210 accesses the source knowledge graphs (e.g., using a Linked Data Fragments framework for accessing interfaces to RDF). In certain embodiments, the overlay search system 210 processes the query by: 1) fetching the source relations (properties) from the source knowledge graphs using a relation overlay; 2) mapping the entities in the query to the source knowledge graphs to generate an entity candidate list; 3) translating the query to knowledge graph specific queries (e.g., SPARQL clauses) that are sent to the respective source knowledge graphs; 4) receiving search results (e.g., tuples) from the source knowledge graphs; and 5) translating and returning the search results in response to the search request. The search request may also be referred to as a search query.

In certain embodiments, the overlay search system 210 fetches the knowledge graph source properties from the properties in the overlay 300. Given that relations in a source knowledge graph are usually very few even in large graphs (e.g., 34 relations in the ConceptNet knowledge graph, and less than 800 non-reference relations in the Wikidata knowledge graph), the overlay search system 210 relies on a relation overlay that maps linguistic terms (e.g., proposition bank verbs from Propbank, which is corpus that is annotated with verbal propositions and their arguments) to the relations in the source knowledge graphs. In this example, the overlay maps hasLocation to conceptnet.io/c/en/at location (in the ConceptNet knowledge graph) and to P 276-Location (in the Wikidata knowledge graph). In certain embodiments, the overlays are created by manual annotation. In other embodiments, the overlays may be created semi-automatically from a set of seed relations and axioms (e.g., 'located-in' and all relations R such that R is included in 'located-in').

In certain embodiments, the overlay search system 210 maps the entities in the query to the source knowledge graphs. In this example, "road", is directly in the overlay and easy to map. This, however, may not always be the case. If the entity is not explicitly mentioned in the overlay, the overlay search system 210 issues queries to identify the entities in the source knowledge graphs, as well as their parent concepts. This may be efficiently done in parallel. Furthermore, the queries that ask for a given term and its parents are relatively efficient. Each such query has the (pseudo-code) pattern "((?s hasAlias NAME) AND (?s IsA ?parent) AND [OPTIONAL (?s ?p ?o)])" where the hasAlias property stands for rdfs: label or skos:altName or any other property in the relation overlay that refers to names and aliases. The IsA relationship is mapped into "(wdt:P31, wdt:P279)" in the Wikidata knowledge graph, and to conceptnet.io/c/en/at location in the ConceptNet knowledge graph. The ?p variable stands for any other properties that may be mentioned in a query, if desired, in order to provide a shorter entity candidate list.

In certain embodiments, the overlay search system 210 obtains a parent list from the query and eliminates candidates by comparing their parents to the existing entity overlay. Notice that these extra queries (two in this example) are efficient, as most concept hierarchies are a few levels deep.

In this example, overlay search system 210 obtains the mappings to "road" from both the ConceptNet knowledge graph and the Wikidata knowledge graph by issuing queries to these source knowledge graphs, obtaining conceptnet.io/c/en/road and Q34442-road.

Once the overlay search system 210 obtains the source entities and properties, the overlay search system 210 translates the original query (?x, locatedIn, road) to SPARQL clauses and sends the SPARQL clauses to the underlying query service (e.g., a Linked Data Fragments query service), to the source knowledge graphs. In this example, the overlay search system 210 issues "(?x, wdt:P276, wd:Q34442)" to the Wikidata knowledge graph and issues "(?x, https://conceptnet.io/c/en/at location, https://conceptnet.io/c/en/road)" to the ConceptNet knowledge graph.

Third, the overlay search system 210 receives tuples in response to the SPARQL clauses from the ConceptNet knowledge graph and the Wikidata knowledge graph. The tuples may be expressed as a set of statements in a logic language that may be processed with a reasoner.

FIG. 4A illustrates predicate mappings 400 in accordance with certain embodiments. In particular, the overlay search system 210 generates the predicate mappings 400 in order to answer the original query (?x, locatedIn, road) question.

FIG. 4B illustrates resulting tuples from the query in accordance with certain embodiments. In particular, the last statement, which may also be read as hasLocation (Car-123, road), may be proven to be consistent with the rest of the statements.

In certain embodiments, instead of the query, (?x, hasLocation, road), the overlay search system 210 could have asked a similar question using the vocabulary of one of the source knowledge graphs, such as (?x, hasLocation, Q34442-road), or using the vocabulary from both source knowledge graphs, such as (?x, https://conceptnet.io/c/en/atLocation, Q34442-road).

In certain embodiments, the overlay search system 210 uses probabilities. That is, for the statement (Car-123-Q108464318, hasLocation, road), it is not likely that every car of type Car-123 are on the road, all the time. This statement comes from the semantics of AtLocation in the ConceptNet knowledge graph, with the intended meaning of "things you can usually find at a road".

The overlay search system 210 leverages probabilities to qualify these statements. The overlay search system 210 may use these probabilities by enhancing the mappings with a probability:

Map(https://conceptnet.io/c/en/at location, hasLocation, 0.7)

Then, the overlay search system 210 propagates the information (using a variety of heuristics) to the statement:

(Car-123, hasLocation, road, 0.7)

In certain embodiments, the overlay search system 210 federates source knowledge graphs using overlays. Formally a source knowledge graph kg, is made of edges of the type (s, p, o) where s, p∈Nodes$_{kg}$ and p∈Relations$_{kg}$. The overlay search system 210 defines an overlay graph, RO$_{graph}$, as a set of seed entities N$_{ov}$ (corresponding to nodes of the overlay "ov") plus a set of seed properties or relations (corresponding to edges of the overlay), R$_{ov}$, together with mappings (Map$_n$: Nodes$_{kg}$→N$_{ov}$) and (Map$_R$: Relations$_{kg}$→R$_{ov}$) for each source knowledge graph kg being federated and a set of rules RO-RULES.

In certain embodiments, the relation overlay includes mappings to the most common properties, such as IsA, hasAlias, hasPart, Causes, etc.

The RO-RULES describe how new nodes, properties, and edges are to be computed from the source knowledge graphs. FIG. 5 illustrates rules 500 for the overlay in accordance with certain embodiments. These rules 500 are general and effective in overlays for a variety of domains. In the rules 500, the overlay search system 210 assumes that the predicate Map ( ) maps an entity in the source kg to the overlay. In addition, in certain embodiments, one or more rules are user defined.

Through the overlay, the overlay search system 210 issues SPARQL queries against one or more virtually federated source knowledge graphs without the need to use the vocabulary that is specific to each source knowledge graph.

Each search result is a set of tuples or logic predicates that may be evaluated for consistency using reasoners.

FIGS. 6A-6E illustrate an example 600, 610, 620, 630, 640, 650 of tuples that may be expressed as a set of statements in a logic language that may be processed with a reasoner in accordance with certain embodiments. The example explains the logic statements involved in the implementation of the overlay and how the overlay is processed using a simple overlay, namely road, car and locatedIn. Once the overlay and its mappings to two concepts and relations of the source knowledge graphs (the Wikidata knowledge graph and the ConceptNet knowledge graph, the overlay search system 210 connects information from the source knowledge graphs through the overlay without modifying the source knowledge graphs.

The overlay defines a formal first order logic axiom system that may be processed by any reasoner.

For this example, the overlay contains the seed concepts Road, Car and the two properties hasLocation and hasType. The source Wikidata knowledge graph has two concepts wd_road and wd_car, plus relations wd_location, wd_instanceOf and wd_subClass of. The source ConceptNet knowledge graph has concepts cn_road, cn_car and relations cn_atLocation, cn_IsA and cn_External URL.

The overlay search system 210 adds the axioms in of FIG. 6B and asserts that all types of cars, including trucks or vans, are located on a road, even though those statements are not part of either the source Wikidata knowledge graph or the source Conceptnet knowledge graph explicitly.

Figure 7:
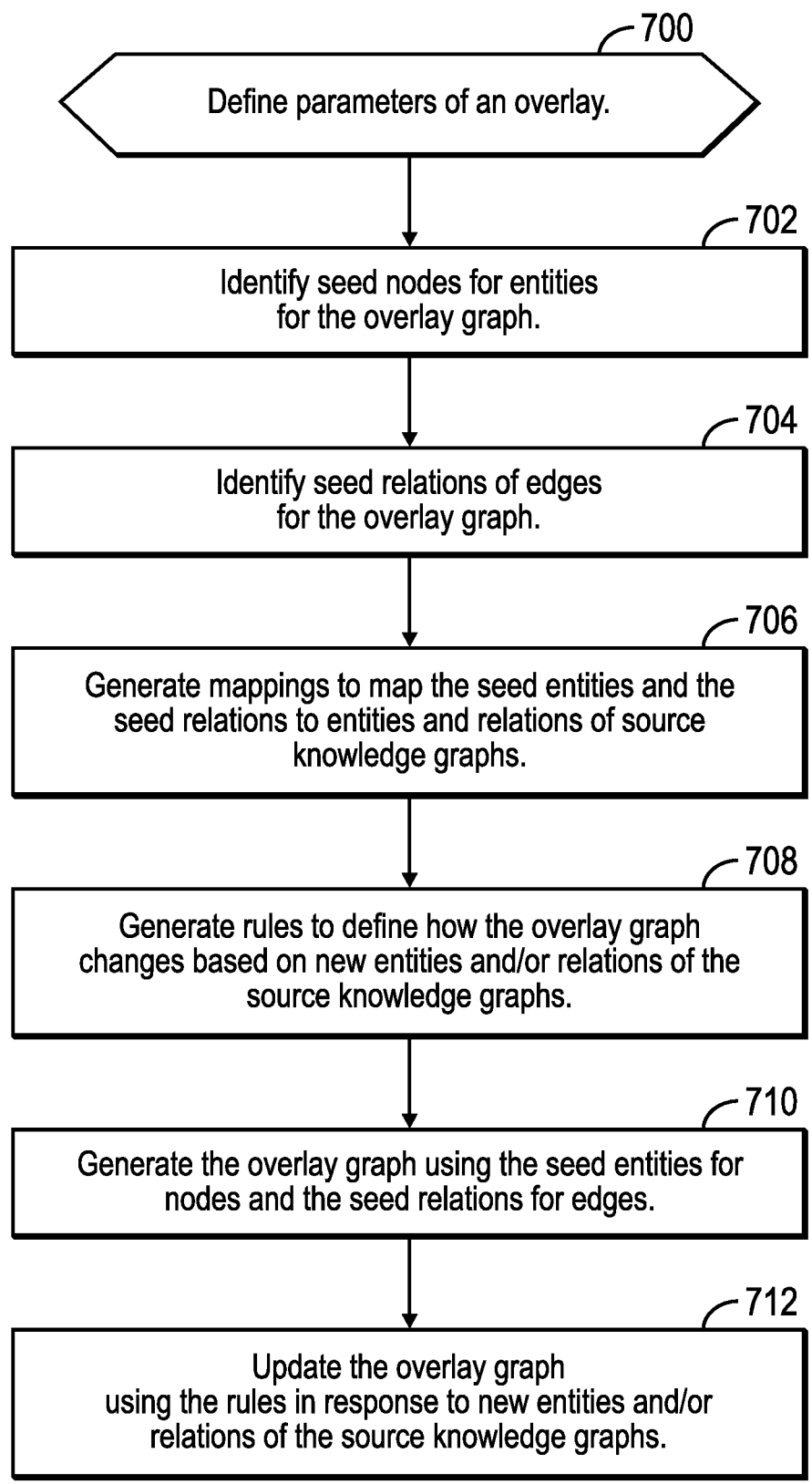
FIG. 7 illustrates, in a flowchart, operations for generating an overlay graph in accordance with certain embodiments.

FIG. 7 illustrates, in a flowchart, operations for generating an overlay graph in accordance with certain embodiments. Control begins at block 700 with the overlay search system 210 defining parameters of an overlay. Defining the parameters may include retrieving the parameters or identifying the parameters. In block 702, the overlay search system 210 identifies seed entities of nodes for an overlay graph. In block 704, the overlay search system 210 identifies seed relations of edges for the overlay graph.

In block 706, the overlay search system 210 generates mappings to map the seed entities and the seed relations to entities and relations of source knowledge graphs. In block 708, the overlay search system 210 generates rules to define how the overlay graph changes based on new entities and/or relations of the source knowledge graphs.

In block 710, the overlay search system 210 generates the overlay graph using the seed entities for nodes and the seed relations for edges. In block 712, the overlay search system 210 updates the overlay graph using the rules in response to new entities and/or relations of the source knowledge graphs.

Figure 8A:
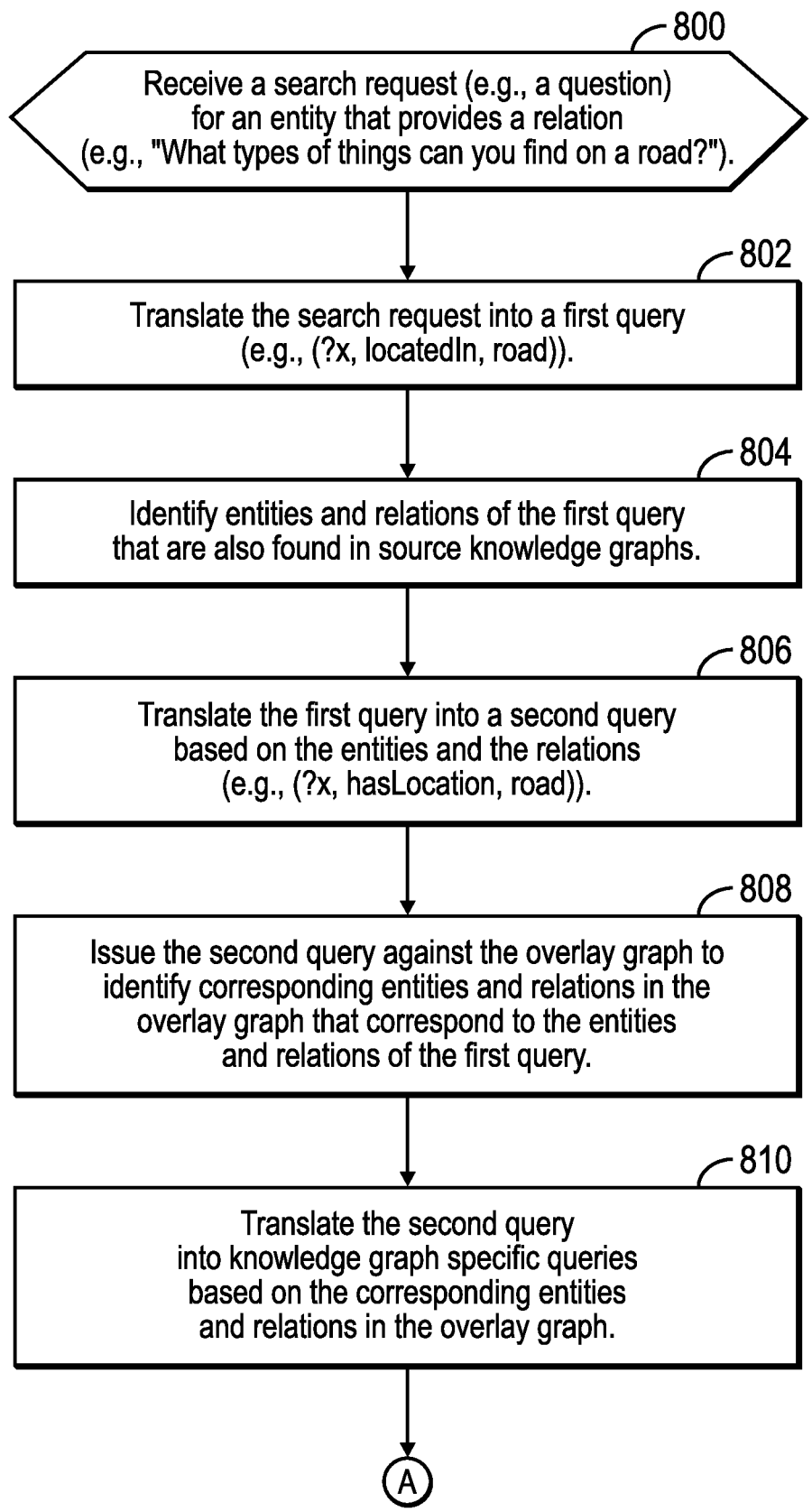
FIGS. 8A and 8B illustrate, in a flowchart, operations for mapping entities and relations in accordance with certain embodiments.

FIGS. 8A and 9B illustrate, in a flowchart, operations for mapping entities and relations in accordance with certain embodiments. Control begins at block 800 with the overlay search system 210 receiving a search request (e.g., a question) for an entity that provides a relation (e.g., "What types of things can you find on a road?"). In block 802, the overlay search system 210 translates the search request into a first query (e.g., (?x, locatedIn, road)).

In block 804, the overlay search system 210 identifies entities and relations of the first query that are also found in source knowledge graphs. In block 806, the overlay search system 210 translates the first query into a second query based on the entities and the relations (e.g., (?x, hasLocation, road)).

Figure 8B:
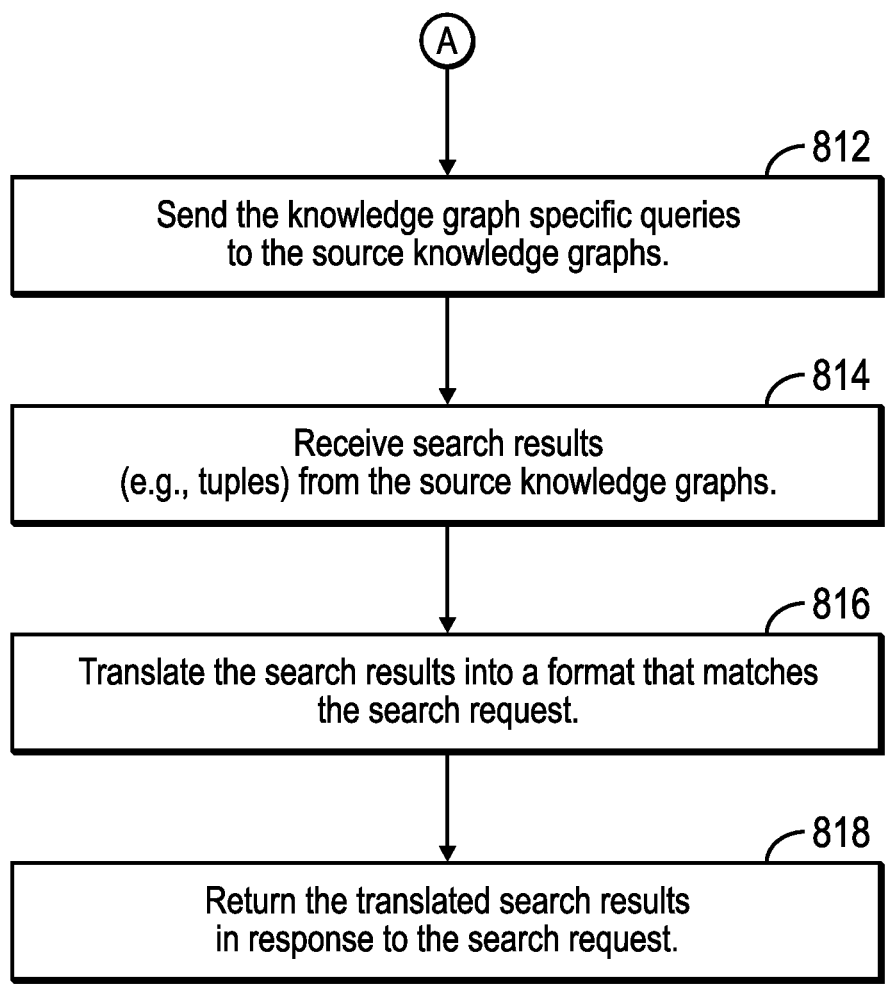

In block 808, the overlay search system 210 issues the second query against the overlay graph to identify corresponding entities and relations in the overlay graph that correspond to the entities and relations of the first query. In block 810, the overlay search system 210 translates the second query into knowledge graph specific queries based on the corresponding entities and relations in the overlay graph. In certain embodiments, the overlay search system 210 uses mappings to identify the entities and relations of the overlay graph that are also found in the source knowledge graphs and uses the mapped entities and relations of the source knowledge graphs to generate the knowledge graph specific queries. In certain embodiments, a different knowledge graph specific query is sent to each different source knowledge graph. In certain embodiments, the number of source knowledge graphs queries may be limited based on various factors (e.g., based on a total number (such as search no more than 10 source knowledge graphs), based on the entities and relations of the source knowledge graphs, etc.). From block 810 (FIG. 8A), processing continues to block 812 (FIG. 8B).

In block 812, the overlay search system 210 sends the knowledge graph specific queries to the source knowledge graphs. In block 814, the overlay search system 210 receives search results (e.g., tuples) from the source knowledge graphs. In block 816, the overlay search system 210 translates the search results into a format that matches the search request. For example, the tuples may be translated into natural language sentences. In block 817, the overlay search system 210 returns the translated search results in response to the search request.

Figure 9:
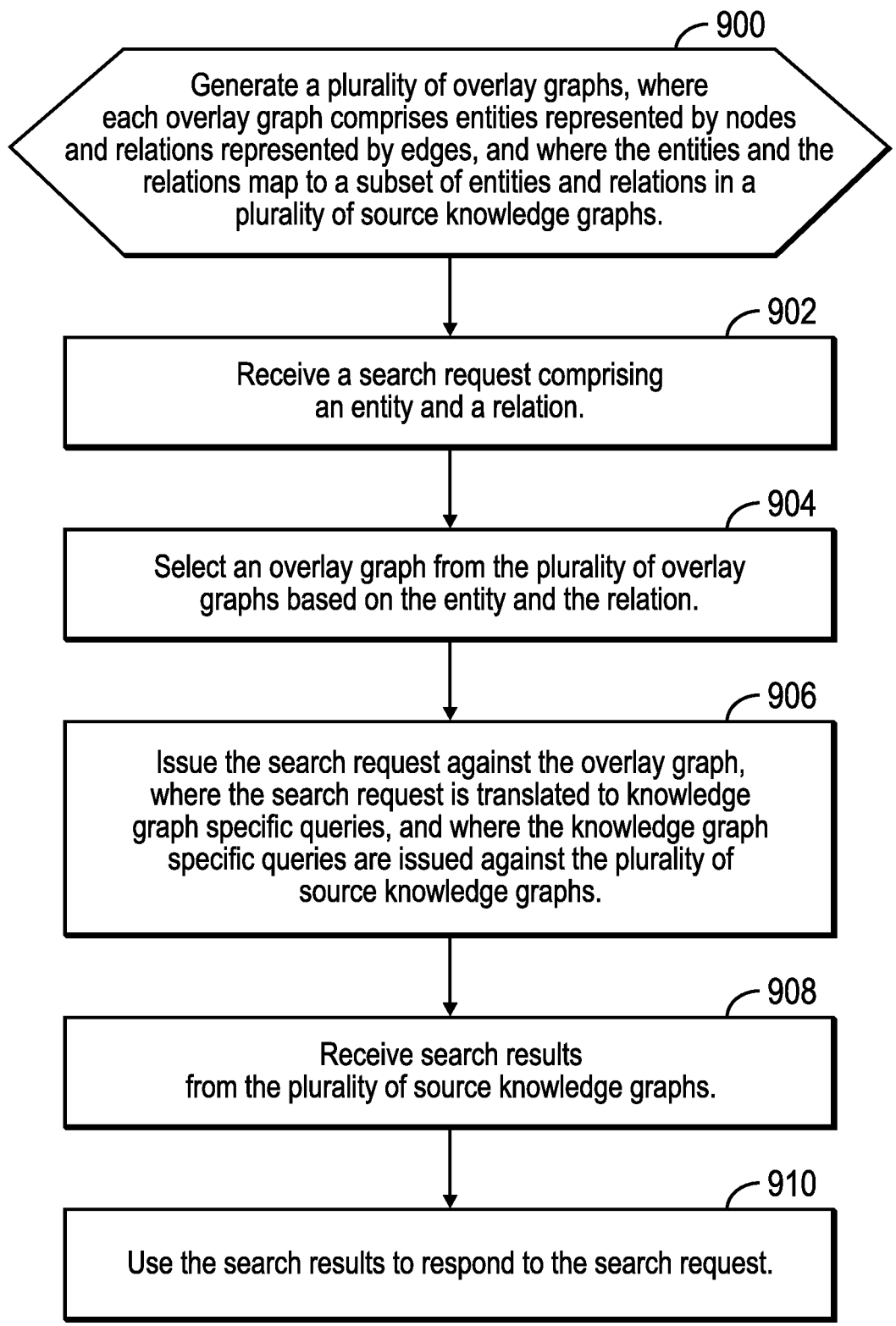
FIG. 9 illustrates, in a flowchart, operations for performing a search using an overlay graph in accordance with certain embodiments.

FIG. 9 illustrates, in a flowchart, operations for performing a search using an overlay graph in accordance with certain embodiments. Control begins at block 900 with the overlay search system 210 generating a plurality of overlay graphs, where each overlay graph comprises entities represented by nodes and relations represented by edges, and where the entities and the relations map to a subset of entities and relations in a plurality of source knowledge graphs. Mappings describe which entities and relations of an overlay graph correspond to (i.e., map to) entities and relations of the plurality of source knowledge graphs.

In block 902, the overlay search system 210 receives a search request comprising an entity and a relation. In other embodiments, the search request may include a plurality of entities and/or relations.

In block 904, the overlay search system 210 selects an overlay graph from the plurality of overlay graphs based on the entity and the relation. In additional embodiments, the overlay graph is selected based on the entity or the relation.

In block 906, the overlay search system 210 issues the search request against the overlay graph, where the search request is translated to knowledge graph specific queries, and where the knowledge graph specific queries are issued against the plurality of source knowledge graphs.

In block 908, the overlay search system 210 receives search results from the plurality of source knowledge graphs. In certain embodiments, each of the plurality of source knowledge graphs executes a knowledge graph specific query and returns its search results.

In block 910, the overlay search system 210 uses the search results to respond to the search request. In particular, the overlay search system 210 may aggregate the search results from the plurality of source knowledge graphs and may translate the search results into a form corresponding to the search query (e.g., into natural language).

In certain embodiments, it is determined that a source knowledge graph of the plurality of source knowledge graphs has changed and logical rules are used to modify the overlay graph, where the logical rules describe how to map new nodes and new edges of the source knowledge graph to the overlay graph.

In certain embodiments, in response to the search request being issued against the overlay graph, the overlay search system 210 translates the search request into a first query, identifies entities and relations of the first query that are also found in the plurality of source knowledge graphs, translates the first query into a second query based on the identified entities and relations, and issues the second query against the overlay graph to identify corresponding entities and relations in the overlay graph that correspond to the entities and the relations of the first query.

In certain embodiments, the plurality of source knowledge graphs comprise a plurality of ontological knowledge graphs, and where the overlay graph maps to the plurality of ontological knowledge graphs to present a single, unified, semantic view of the entities and the relations of the plurality of ontological knowledge graphs.

In certain embodiments, mappings are used to map the entities and relations of the overlay graph to the entities and relations of the plurality of source knowledge graphs.

The overlay search system 210 provides a technique to partially and virtually connect source knowledge graphs using entity and relation overlays. The overlay search system 210 defines entity and relation subgraphs that summarize one or more source knowledge graphs in terms of seed concepts, properties, and logical rules. The overlay search system 210 evaluates a query issued against a graph overlay and retrieves information from the underlying, source knowledge graphs without users needing to know the details of these source knowledge graphs.

In certain embodiments, to fully federate source knowledge graphs, the overlay search system 210 has access to the source knowledge graphs (or knowledge graphs) from a single Application Programming Interface (API) and links or "connects" to the contents of the source knowledge graphs according to a systematic set of semantic rules so that the aggregate knowledge is used in a meaningful way.

More recently, AI models have been used to automatically match and link ontologies. In certain embodiments, the overlay search system 210 uses the AgreementMakerLight (AML) AML ontology matching system to provide an initial mapping of the seed concepts.

The overlay search system 210 provides an overlay ontologic model plus a mapping that enables both virtual federation and logical reasoning. The overlay tends to be small, so it can be managed manually by users.

In certain embodiments, the overlay search system 210 learns some of the overlay mappings by using Deep Learning technologies (e.g., federated source knowledge graph learning via embeddings). However, the overlay search system 210 focuses on the modeling and linking of federated source knowledge graphs with entity and relation overlays, a symbolic approach that may be verified and validated by users.

In certain embodiments, the overlay search system 210 accesses the source knowledge graphs using a Linked Data Fragments framework for accessing interfaces to RDF. LDF may be described as a service that allows execution of queries against live Linked Data servers on the Web. This includes federated querying from a single point. In particular, LDF handles the logistics of sending the query requests to the underlying, source knowledge graphs without any semantic interpretation.

The overlay search system 210 generates an overlay that is not an ontology, but a set of seed concepts, an overlay graph, and logic rules.

With embodiments, an overlay does not map every element of the underlying, source knowledge graph, so the mapping is not strict or brittle, which matters when using dynamic underlying, source knowledge graphs, such as the Wikidata knowledge graph. For example, the overlay search system 210 includes vehicles and all of its instances and subclasses, but the overlay search system 210 maps just the vehicles. With embodiments, the underlying, source knowledge graphs are not databases.

With embodiments, the overlay may be used for non-linguistic source knowledge graphs. Furthermore, embodiments are agnostic to the mapping ontology itself.

In certain embodiments, the overlay search system 210 maps edges (relations) between different source knowledge graphs. Relations are the structuring mechanism of the source knowledge graphs and, as such, any kind of alignment between different source knowledge graphs requires a careful consideration and mapping of their relations.

The overlay search system 210 uses rules to build the relation overlay. These rules map patterns in the underlying, source knowledge graphs to nodes and/or edges in the overlay graph. The rules may be complex and may map not only single nodes or edges, but whole subgraphs to a particular node or edge in the overlay. In this manner, the overlay search system 210 is able to summarize large, complex graphs.

The overlay search system 210 allows for the aggregation of different node or edge types into a single (possibly new) type in the overlay layer.

The overlay search system 210 uses rules (axioms) to map complex patterns in the underlying, source knowledge graphs to the corresponding entities and relations in the overlay graph.

The overlay search system 210 integrates heterogeneous source knowledge graphs via node (entity) and edge (relation) mappings.

In certain embodiments, the overlay search system 210 maps and accesses several ontological knowledge graphs to present a single, unified, semantic view of the data of these several ontological knowledge graphs. The accesses the multiple, ontologic source knowledge graphs and partially maps these multiple, ontologic source knowledge graphs into a single unified view via an overlay. The overlay includes a seed overlay graph that is defined within a data model where nodes and edges are mapped to respective nodes and edges of underlying subgraphs and includes logical rules that describe how to map new nodes and edges onto the seed overlay graph.

In certain embodiments, the overlay search system 210 receives a query issued against the overlay graph and retrieves information from the underlying multiple ontological knowledge graphs without requiring the query to provide details of these multiple ontological knowledge graphs.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    generating a plurality of overlay graphs, wherein each overlay graph comprises entities represented by nodes, relations represented by edges, and mappings, wherein the mappings of each of the plurality of overlay graphs map the entities and the relations of that overlay graph to a subset of entities and relations in a plurality of source knowledge graphs, and wherein each of the plurality of overlay graphs is associated with logical rules that describe how to map new entities and new relations of the plurality of source knowledge graphs to that overlay graph;
    receiving a search request comprising an entity and a relation;
    selecting an overlay graph from the plurality of overlay graphs based on the entity and the relation of the search request;
    issuing the search request against the overlay graph, wherein the search request is translated to knowledge graph specific queries, and wherein the knowledge graph specific queries are issued against the plurality of source knowledge graphs;
    receiving search results from the plurality of source knowledge graphs; and
    using the search results to respond to the search request.

2. The computer-implemented method of claim 1, comprising operations for:
    determining that a source knowledge graph of the plurality of source knowledge graphs has changed; and
    using logical rules associated with the overlay graph to modify the overlay graph.

3. The computer-implemented method of claim 1, comprising operations for:
   translating the search request into a first query; and
   identifying entities and relations of the first query that are also found in the plurality of source knowledge graphs.

4. The computer-implemented method of claim 3, comprising operations for:
   translating the first query into a second query based on the identified entities and relations; and
   issuing the second query against the overlay graph to identify corresponding entities and relations in the overlay graph that correspond to the entities and the relations of the first query.

5. The computer-implemented method of claim 1, wherein the plurality of source knowledge graphs comprise a plurality of ontological knowledge graphs, and wherein the overlay graph maps to the plurality of ontological knowledge graphs to present a single, unified, semantic view of the entities and the relations of the plurality of ontological knowledge graphs.

6. The computer-implemented method of claim 1, wherein each of the mappings is associated with a probability.

7. The computer-implemented method of claim 1, comprising operations for:
   translating the search results into a format corresponding to the search request.

8. A computer program product, the computer program product comprising a computer readable storage medium having program instructions embodied therewith, the program instructions executable by a processor to cause the processor to perform operations for:
   generating a plurality of overlay graphs, wherein each overlay graph comprises entities represented by nodes, relations represented by edges, and mappings, wherein the mappings of each of the plurality of overlay graphs map the entities and the relations of that overlay graph to a subset of entities and relations in a plurality of source knowledge graphs, and wherein each of the plurality of overlay graphs is associated with logical rules that describe how to map new entities and new relations of the plurality of source knowledge graphs to that overlay graph;
   receiving a search request comprising an entity and a relation;
   selecting an overlay graph from the plurality of overlay graphs based on the entity and the relation of the search request;
   issuing the search request against the overlay graph, wherein the search request is translated to knowledge graph specific queries, and wherein the knowledge graph specific queries are issued against the plurality of source knowledge graphs;
   receiving search results from the plurality of source knowledge graphs; and
   using the search results to respond to the search request.

9. The computer program product of claim 8, wherein the program instructions executable by the processor to cause the processor to further perform operations for:
   determining that a source knowledge graph of the plurality of source knowledge graphs has changed; and
   using logical rules associated with the overlay graph to modify the overlay graph.

10. The computer program product of claim 8, wherein the program instructions executable by the processor to cause the processor to further perform operations for:
    translating the search request into a first query; and
    identifying entities and relations of the first query that are also found in the plurality of source knowledge graphs.

11. The computer program product of claim 10, wherein the program instructions executable by the processor to cause the processor to further perform operations for:
    translating the first query into a second query based on the identified entities and relations; and
    issuing the second query against the overlay graph to identify corresponding entities and relations in the overlay graph that correspond to the entities and the relations of the first query.

12. The computer program product of claim 8, wherein the plurality of source knowledge graphs comprise a plurality of ontological knowledge graphs, and wherein the overlay graph maps to the plurality of ontological knowledge graphs to present a single, unified, semantic view of the entities and the relations of the plurality of ontological knowledge graphs.

13. The computer program product of claim 8, wherein each of the mappings is associated with a probability.

14. The computer program product of claim 8, comprising operations for:
    translating the search results into a format corresponding to the search request.

15. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
    generating a plurality of overlay graphs, wherein each overlay graph comprises entities represented by nodes, relations represented by edges, and mappings, wherein the mappings of each of the plurality of overlay graphs map the entities and the relations of that overlay graph to a subset of entities and relations in a plurality of source knowledge graphs, and wherein each of the plurality of overlay graphs is associated with logical rules that describe how to map new entities and new relations of the plurality of source knowledge graphs to that overlay graph;
    receiving a search request comprising an entity and a relation;
    selecting an overlay graph from the plurality of overlay graphs based on the entity and the relation of the search request;
    issuing the search request against the overlay graph, wherein the search request is translated to knowledge graph specific queries, and wherein the knowledge graph specific queries are issued against the plurality of source knowledge graphs;
    receiving search results from the plurality of source knowledge graphs; and
    using the search results to respond to the search request.

16. The computer system of claim 15, wherein the program instructions further perform operations comprising:
    determining that a source knowledge graph of the plurality of source knowledge graphs has changed; and
    using logical rules associated with the overlay graph to modify the overlay graph.

17. The computer system of claim 15, wherein the program instructions further perform operations comprising:
   translating the search request into a first query; and
   identifying entities and relations of the first query that are also found in the plurality of source knowledge graphs.

18. The computer system of claim 17, wherein the program instructions further perform operations comprising:
   translating the first query into a second query based on the identified entities and relations; and
   issuing the second query against the overlay graph to identify corresponding entities and relations in the overlay graph that correspond to the entities and the relations of the first query.

19. The computer system of claim 15, wherein the plurality of source knowledge graphs comprise a plurality of ontological knowledge graphs, and wherein the overlay graph maps to the plurality of ontological knowledge graphs to present a single, unified, semantic view of the entities and the relations of the plurality of ontological knowledge graphs.

20. The computer system of claim 15, wherein each of the mappings is associated with a probability.

\* \* \* \* \*